May 11, 1926.

H. L. JOHNSON

CONVERTIBLE BODY FOR VEHICLES

Filed Nov. 24, 1920

Inventor:
Henry L. Johnson,

May 11, 1926.
H. L. JOHNSON
CONVERTIBLE BODY FOR VEHICLES
Filed Nov. 24, 1920    2 Sheets-Sheet 2
1,584,545
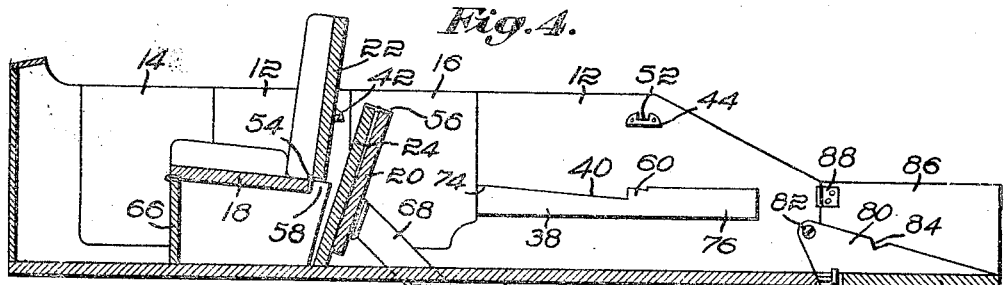
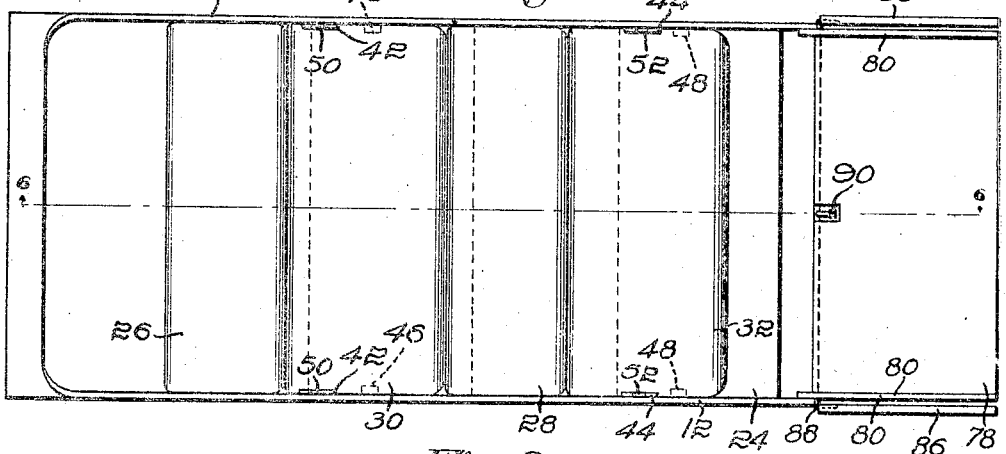
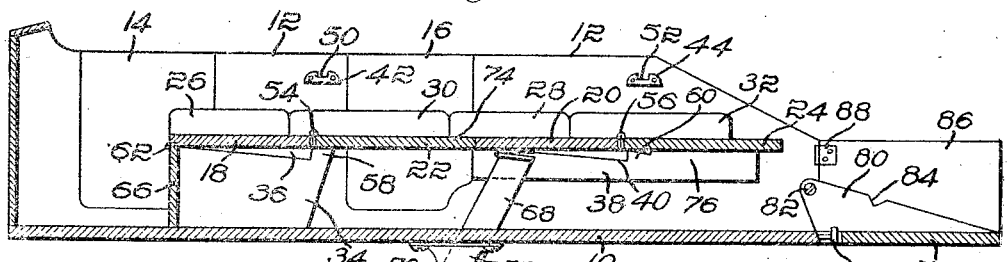
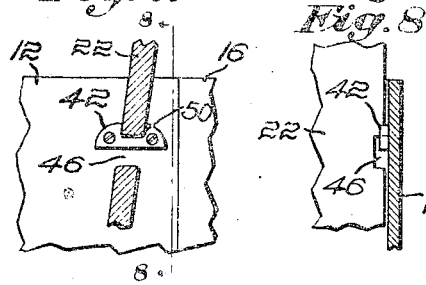

Patented May 11, 1926.

1,584,545

UNITED STATES PATENT OFFICE.

HENRY L. JOHNSON, OF ROSLINDALE, BOSTON, MASSACHUSETTS.

CONVERTIBLE BODY FOR VEHICLES.

Application filed November 24, 1920. Serial No. 426,118.

This invention relates to convertible bodies for vehicles, and aims to provide a body of general utility, convertible to meet the needs of various situations, such as the carrying of passengers and baggage, as well as providing sleeping quarters within the body. The invention will be best understood by reference to the following description, when taken in connection with the accompanying drawings of one illustrative embodiment thereof, while its scope will be more particularly pointed out in the appended claims.

In the drawings:

Fig. 4 is a central longitudinal section similar to Fig. 3, but showing the rear seat and back-rest folded to a position adjacent to the rear of the front seat, and with the rear end of the body unfolded and extended to increase the capacity for carrying luggage and the like;

Fig. 5 is a plan of the body as it appears arranged to provide sleeping quarters;

Fig. 6 is a central longitudinal section on line 6—6 of Fig. 5;

Fig. 7 is a vertical longitudinal section on an enlarged scale, illustrating in detail one of the devices for holding the back-rests in an upstanding position; and Fig. 8 is a sectional view on line 8—8 of Fig. 7.

According to the drawings, and to the embodiment of my invention which is selected for exemplification, I have shown a vehicle body having a floor 10 and a pair of upstanding longitudinal side walls 12, each herein provided with front and rear portions 14 and 16 affording access in the usual manner to the inside of the body.

Figure 3:
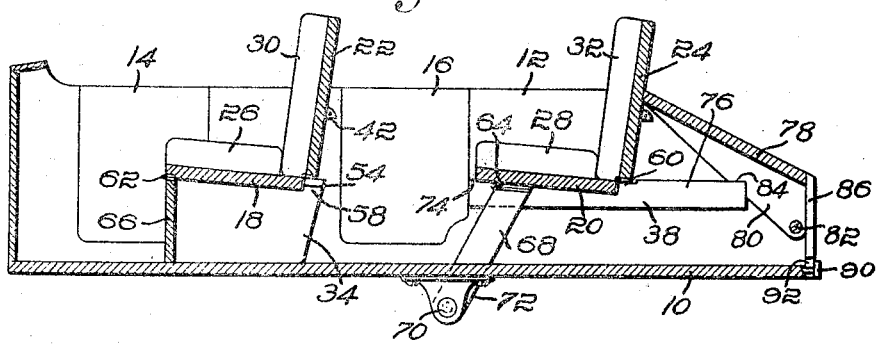
Fig. 3 is a central longitudinal sectional view of the body arranged as in Fig. 1.

Referring now to Fig. 3, the body is provided with one or more, herein two, seats 18 and 20 having back-rests 22 and 24. The seats may be provided with any suitable seat cushions 26 and 28, and the back-rests with cushions 30 and 32, respectively. Preferably, the seats are normally slightly inclined downwardly and rearwardly, and the back-rests are inclined upwardly and rearwardly, as clearly shown in Fig. 3. This enables the cushions themselves to be made of substantially uniform thickness, for a purpose which will presently appear.

The front seat 18 is supported by suitable means, herein a pair of laterally disposed supports 34 adjacent to the side walls 12, and on which the ends of the seat rest, and its supports are provided with downwardly and rearwardly inclined recesses 36, in which the ends of the seat are normally received. Similarly, the rear seat 20 is mounted on a pair of lateral supports 38 provided with like recesses 40 (see Fig. 4).

Suitable means are provided to support the back-rests either in upstanding positions or in reclining positions at will, thereby adapting the vehicle to the carrying of passengers in the usual way, or to provide sleeping quarters within the body. When the back rests are in upstanding positions, they may be secured by suitable means, herein exemplified by pairs of supports 42 and 44, appropriately interlocking with the back-rests, as by providing the latter with notches 46 (see Figs. 7 and 8) and 48, in which the supports are received, and providing the latter in turn with notches 50 and 52, in which the back-rests are secured, as will be clearly understood from an inspection of Figs. 7 and 8, which show one of the supports for the back-rest of the front seat. Either back-rest may be unlocked by simply lifting it to clear the notch in its support, and then by moving it either forward or backward as circumstances may require.

Removal of the back-rests from their normal upstanding positions represented in Fig. 3 to the reclining positions represented in Fig. 6 is herein conveniently accomplished by the provision of suitable pivots, herein hinges 54 and 56 connecting the back-rests 22 and 24, respectively, to the seats 18 and 20, this arrangement being such that the back-rests may be folded in a forward and downward direction against their respective seats, as exemplified by the rear back-rest in Fig. 4, or rearwardly, as exemplified in Fig. 6.

When the back-rests are folded in a rearward and downward direction to the reclining positions represented in Fig. 6, it is desirable that their respective seats shall be horizontal instead of inclined, the reason being that to make a convertible bed in the simplest manner, the seats and back-rests should present a level surface on which the cushions may be placed. This is easily accomplished by extending the supports 34 and 38 rearwardly, as at 58 and 60, beyond the recesses 36 and 40, and at a height substantially the same as that of the under side of the front edges of the seats. This being so, it is evident that downward and rearward movement of either back-rest will be accompanied by an upward movement of the rear edge of the seat, as will be evident from an inspection of Fig. 6. In this connection, it is desirable to hinge the front edges of the seats to suitable supports, and to this end, I have herein provided for this purpose hinges 62 and 64 (see Fig. 6) appropriately mounted as on supports 66 and 68, respectively. These hinges allow the seats to swing up and down about their axes, while still preventing forward and backward movement of the seats. In the present example, the support 66 is simply an upright wall beneath the front edge of the front seat, but the rear support 68 has suitable provision to permit the rear seat to be moved bodily in a forward direction to a point adjacent to the back of the front seat, as represented in Fig. 4. This can be accomplished in a simple and convenient manner by making the supports 68 in the form of links pivoted at 70 on appropriate supports, herein brackets 72, which may be secured to the under side of the floor 10, or to the framework. When the rear seat and back-rest are thus folded forward, the space which they previously occupied can be utilized for the carrying of baggage or freight.

Referring now to Figs. 5 and 6, which show the vehicle body arranged to provide sleeping quarters, suitable supports are provided for the back-rests when in reclining positions. In the present example, the back-rest 22 rests upon a support 74, which is a forward prolongation of the support 38, while the back-rest 24 rests upon a support 76, which is a rearward prolongation of the support 38. It should, of course, be understood, however, that these several supports need not be consolidated, or made integral, but that this is done in the present example merely for convenience. When the seats and back-rests are arranged horizontally, as shown in Fig. 6, the several cushions which are of uniform thickness may be spread out, and will thus afford a continuous level bed, which will accommodate one or more persons lying lengthwise of the bed.

Figure 1:
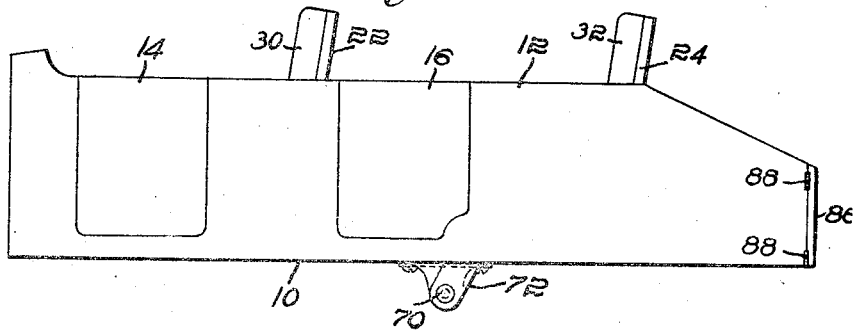
Fig. 1 is a side elevation of a vehicle body exemplifying my invention, showing the same as it appears with its seats arranged for maximum passenger-carrying capacity.
Figure 2:
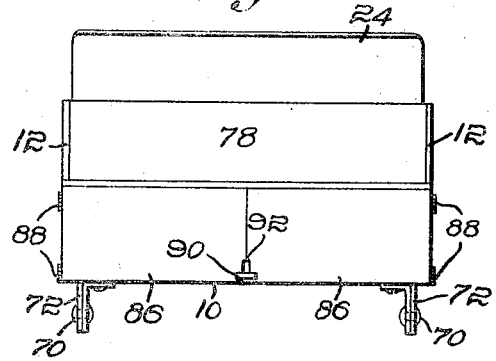
Fig. 2 is a rear elevation of the body as shown in Fig. 1.

When the body is arranged to provide sleeping quarters, it is desirable that the rear end of the same shall be elongated as compared with its usual arrangement (see Figs. 5 and 6). This elongation of the body is also advantageous in connection with the carrying of freight and baggage (as for example, see Fig. 4). One convenient way of accomplishing this is to provide a cover 78, which in one position (see Fig. 3) is above the floor, and houses a space between the cover and the floor, and which may be moved from this position to one in which it presents a prolongation of the floor (see Fig. 4). Herein, this is accomplished by providing the cover with a pair of side walls 80 80 received between the side walls 12 of the body and suitably pivoted thereto, as by pivots 82. The walls 80 may be notched as at 84 to rest upon the rear ends of the supports 76, thereby to support the cover 78 in its normal position, as shown in Fig. 3. The rear end of the space beneath the cover 78 may be closed by suitable means, herein a pair of doors 86 mounted on vertical hinges 88 on the side walls 12 of the body. These doors may be locked in their closed positions by appropriate means, herein exemplified by a turn button 90 (see Fig. 2) pivoted to the floor 10 to turn about a horizontal axis, and normally overlapping the meeting vertical edges of the doors. The latter may be recessed to provide a vertical slot as at 92, and when the turn button is rotated about its axis to a position in registration therewith, the doors are unlocked and may be opened. The cover 78 may then be lowered to the position shown in Figs. 4, 5 and 6. The cover then constitutes a rearward prolongation of the floor, and the doors present rearward prolongations of the side walls 12 of the body. This arrangement affords a considerably increased baggage and freight carrying capacity, as well as increasing the available length of the sleeping accommodations.

Having thus described one embodiment of my invention, but without limiting myself thereto, what I claim and desire by Letters Patent to secure is:

1. In a vehicle body, the combination of a pair of longitudinal side walls, a transverse seat and back-rest pivotally connected together adjacent the rear of said seat and the bottom of said back-rest to permit the latter to be swung from an upstanding position rearwardly and downwardly to a reclining position, a pivotal mounting on which said seat is mounted to swing from an inclined position to a horizontal position, and means to support said back-rest in an upstanding or a reclining position and to utilize forward and backward swinging movement of said back-rest to produce downward and upward movement of the rear edge of said seat.

2. In a vehicle body, the combination of a floor, a pair of side walls upstanding from said floor, a cover positioned above said floor, a pair of doors pivoted to swing about vertical axes from positions across said body to positions in which they present prolongations of said walls, and means providing for removal of said cover from its position above said floor to a position in which it presents a prolongation of said floor.

In testimony whereof, I have signed my name to this specification.

HENRY L. JOHNSON.